3,147,121
**PREPARATION OF SILAGE WITH *PEDIOCOCCUS CEREVISIAE***
William L. Brown, Ottumwa, Iowa, assignor to John Morrell & Co., Chicago, Ill., a corporation of Maine
No Drawing. Filed Dec. 1, 1960, Ser. No. 72,852
4 Claims. (Cl. 99—9)

This invention is concerned with an improved method of preparing silage. More particularly, it is concerned with a method of preparing silage by bacterial fermentation.

The making of silage, preserved forage material, especially from pasture and hay fields, has a number of advantages. Thus, in converting grass to silage about 80–85% of the nutritive value is retained, whereas only 70–75% of the nutritive value is retained when it is converted to hay. Additionally, properly made grass silage will provide much more protein and several times more carotene in the ration than field cured hay, thereby increasing materially the carotene and vitamin A of winter milk.

The conversion of green crops into silage is effected by changes that occur when the green forage is stored in the silo in the absence of air. Plant respiration, enzymes present in the plant cells, and bacteria, yeasts and molds present in the crop when it is ensiled all take part in the change.

After the crop is ensiled, plant respiration continues until the oxygen present in the fodder is used up and is replaced by carbon dioxide and nitrogen. Additionally, the enzymes are also active during this time converting sugar into alcohol, carbonic acid, water and acetic, lactic and butyric acids. These enzymes also act on the proteins to some extent liberating peptides, amino acids and some ammonia.

As plant respiration and the activity of the enzymes slow down, the activity of the bacteria, yeast and molds increase. Molds cease growing as soon as the oxygen is exhausted, the yeast soon disappears and only the bacteria remain active in the stored silage. The bacteria produce additional acid from soluble carbohydrates and from alcohol and produce further breakdown products from the other constituents of silage, notably the proteins. When the acidity of the silage increases beyond a certain point, bacterial activity diminishes and the silage-making process is complete.

It has been found that wide variations occur in the type of fermentation, the kinds of acid produced and the quality of the silage. Some improvement in the procedure has been effected by the inclusion of acids and sugars or other readily available carbohydrates at the time the green fodder is ensiled. These additives modify the type of fermentation by increasing the acidity and tend to reduce the breakdown of the protein compounds. However, while these additives have aided in providing a more uniform silage, wide variations in the quality of the silage still occur and other means of more precisely controlling the bacterial fermentation have been sought.

It is an object of the present invention to provide an improved method of ensiling forage material of field and ground plants such as grass, clover, corn, corn fodder, legumes, alfalfa, mixtures thereof and other vegetable and animal forage materials by controlling the bacterial fermentation. A further object is to provide a means of completing the bacterial fermentation in a short time. Still another object is to provide silage with a more appealing flavor and odor. These and other objects of our invention will be apparent from the detailed description hereinafter provided.

In accordance with this invention, these desiderata are achieved by incorporating viable cells of *Pediococcus cerevisiae* in the fodder being ensiled. The addition of this lactic acid-producing culture results in the fermentation of the sugar in the silage material to lactic acid. This produces rapid increase in the acidity (a lowering of the pH) of the silage to a level which suppresses the growth of all other microorganisms. The resulting silage prepared by the addition of *Pediococcus cerevisiae* possesses a clean acid odor and taste and has a pH of about 4.0. Such a pH is considered very desirable in the preparation of silage.

In carrying out my improved process for the preparation of silage, the green fodder is intimately mixed with the *Pediococcus cerevisiae* cells, preferably in such a way that the cells are thoroughly dispersed throughout the fodder. This is most conveniently accomplished by the addition of the *Pediococcus cerevisiae* to the cut fodder by an adapter on the blower used to fill the silo with the cut fodder. The adapter provides a means for simultaneously adding the *Pediococcus cerevisiae* cells, either in dry form or in the form of an aqueous slurry, to the cut green fodder. Alternatively, the *Pediococcus cerevisiae* can be added by packing the silo with alternate layers of the cut fodder and cells of *Pediococcus cerevisiae*. As indicated above, the cells can be either added in dry form, the form in which they are commercially available, or in the form of an aqueous slurry.

The amount of *Pediococcus cerevisiae* added to the cut forage will depend in part upon the nature of the material being ensiled and the method by which it is introduced into the cut fodder. In general, it is desirable to add sufficient cells so that the growth of the organism in the silage will be sufficiently rapid to prevent the destruction of the protein and other nutrients present in the silage. Generally, it is found that an amount of the viable cells ranging from about 0.01 to about 0.05 lb./ton of silage results in the preparation of excellent quality silage in a short period of time under optimum conditions.

Pursuant to a further embodiment of this invention, it is found that the activity of *Pediococcus cerevisiae* can be enhanced by adding a suitable source of carbohydrate assimilable by said microorganism to the green fodder along with the microorganism. Thus, materials providing sources of glucose, fructose, mannose, sugars and the like are generally suitable for addition to the ensiled material. For example, molasses is a convenient and inexpensive source of sugar and provides a growing medium for the *Pediococcus cerevisiae*. The molasses either in dried form or in liquid form can be added simultaneously with the *Pediococcus cerevisiae* cells, or the molasses and the cells can be mixed together just prior to being added to the cut grass fodder in the manner described above.

The following examples are illustrative of methods useful in practicing the present invention.

*Example 1*

To 1000 g. of freshly cut grass was added 0.25 g. of dried *Pediococcus cerevisiae* cells and 9.5 g. of dried molasses. The ingredients were thoroughly mixed, the mixed material packed into a glass jar and then allowed to stand at 76° F. for 72 hours. At this time the pH of the mixture was found to be 4.1, and microscopic and bacterial examination of the resulting silage indicated that fermentation was essentially complete. The silage so prepared had a clean, fresh odor.

*Example 2*

To 1000 g. of freshly cut grass was added 0.5 g. of *Pediococcus cerevisiae* cells and 9.25 g. of dried molasses. The ingredients were then thoroughly mixed, packed into a glass jar and the covered glass jar allowed to stand at 76° F. for 72 hours. At this time the pH of the silage was found to be 4.1, and a microscopic examination indicated the presence of $4 \times 10^7$ acid-producing colonies per gram.

In the same way 1000 g. of the same cut grass was packed into a jar, the jar covered and allowed to stand at 76° F. for 72 hours. At the end of this time, the pH was found to be 5.0, and a microscopic examination indicated the presence of $6 \times 10^7$ of non-acid-producing microorganisms per gram.

*Example 3*

Whole corn was ground and packed in miniature silos according to the procedure of Cullison described in Journal of Animal Science 19, 198–202 (1960). The miniature silo consisted of a two-quart glass jar equipped with a one-hole rubber stopper carrying a short piece of glass tubing to which is attached a valve made by slitting a piece of rubber tubing longitudinally; the valve permitting the escape of gases from the miniature silo but excluding air.

1200 gm. sample of the ground corn was thoroughly mixed with 12 gms. of a mixture of dried *Pediococcus cerevisiae* cells and dried molasses into each of four miniature silos. The level of *Pediococcus cerevisiae* was varied as shown in the tabulated results below. The following table shows the pH and the amount of normal sodium hydroxide necessary to titrate the acid in 100 gms. of the corn silage after 72 hours.

| Sample No. | *P. cerevisiae* Level Equivalent to— | pH After 72 Hours | Cc. of 1 N NaOH Necessary to Titrate the Acid of 100 gms. of Silage |
|---|---|---|---|
| 1 | ½ lb./ton silage | 4.3 | 8.0 |
| 2 | 1 lb./ton silage | 4.2 | 8.4 |
| 3 | 2½ lbs./ton silage | 4.35 | 8.6 |
| 4 | 5 lbs./ton silage | 4.3 | 8.8 |

Various changes and modifications of the invention can be made and, to the extent that such variations incorporate the spirit of this invention, they are intended to be included within the scope of the appended claims.

What is claimed is:

1. In the process of preparing silage the improvement which comprises adding an active culture of *Pediococcus cerevisiae* to forage material being ensiled, said culture being added in an amount of from about 0.01 to about 0.05 pound per ton of silage.

2. In the process of preparing silage the improvement which comprises inoculating the cut green crops used in the preparation of silage with *Pediococcus cerevisiae* cells in an amount of from about 0.01 to about 0.05 pound per ton of silage.

3. The process according to claim 2 wherein the green crop ensiled contains a suitable source of carbohydrate assimilable by *Pediococcus cerevisiae*.

4. The process according to claim 3 wherein the carbohydrate source is molasses.

References Cited in the file of this patent

Kroulik et al.: Journal of Dairy Science 38 (1955), pages 263–271.

Morrison: Feeds and Feeding, 22nd Edition, 1957, Morrison Pub. Co., Ithaca, N.Y., pages 282–283. (Copies in Scientific Library.)